(12) United States Patent  
Lacazette et al.

(10) Patent No.: US 9,194,967 B2  
(45) Date of Patent: Nov. 24, 2015

(54) TOMOGRAPHIC IMAGING OF FRACTURE-FAULT PERMEABILITY ZONES DURING DRILLING OPERATIONS

(75) Inventors: Alfred Lacazette, Lakewod, CO (US); Peter Anderson Geiser, Lyons, CO (US)

(73) Assignee: Global Ambient Seismic, Inc., Missouri City, TX (US)

( * ) Notice: Subject to any disclaimer, the term of this patent is extended or adjusted under 35 U.S.C. 154(b) by 958 days.

(21) Appl. No.: 13/345,646

(22) Filed: Jan. 6, 2012

(65) Prior Publication Data

US 2013/0128694 A1    May 23, 2013

Related U.S. Application Data

(63) Continuation-in-part of application No. 13/302,009, filed on Nov. 22, 2011, now Pat. No. 9,075,158.

(51) Int. Cl.
*G01V 1/42* (2006.01)
*G01V 1/28* (2006.01)

(52) U.S. Cl.
CPC *G01V 1/288* (2013.01); *G01V 1/42* (2013.01); *G01V 2210/1234* (2013.01); *G01V 2210/646* (2013.01); *G01V 2210/65* (2013.01)

(58) Field of Classification Search
CPC ... G01V 1/42; G01V 1/288; G01V 2210/123; G01V 2210/65; G01V 2210/646
USPC ............................................. 367/57
See application file for complete search history.

(56) References Cited

U.S. PATENT DOCUMENTS

| 206,215 | A | 11/1934 | Weatherby |
| 4,964,087 | A | 10/1990 | Widrow |
| 4,965,774 | A | 10/1990 | Ng et al. |
| 5,012,453 | A | 4/1991 | Katz |
| 5,050,130 | A | 9/1991 | Rector et al. |
| 5,377,104 | A * | 12/1994 | Sorrells et al. .................. 702/11 |
| 6,389,361 | B1 | 5/2002 | Geiser |

(Continued)

OTHER PUBLICATIONS

The use of drill-bit energy as a downhole seismic source, Rector, Geophysics, vol. 56, May 1991, p. 628-634.

(Continued)

*Primary Examiner* — Ian J Lobo
(74) *Attorney, Agent, or Firm* — Edward Eugene Thigpen (57) ABSTRACT

Disclosed are various embodiments of methods for identifying faults and fractures, and other permeable features, within geologic layers during a drilling operation comprising; recording microseismic data during a drilling operation; recording times and positions of a drill bit in a well bore during the drilling operation; processing microseismic data at a plurality of selected times and locations to image microseismic events and identifying faults and fractures, and other permeable features, from corresponding images of microseismic events. In other embodiments, the integrity of a cementing operation may be verified by recording microseismic data during a cementing operation; recording times and positions of a cementing operation in a well bore during the cementing operation; processing microseismic data at a plurality of selected times and locations to image microseismic events and identifying faults and fractures, and other permeable features, within the cemented zone from corresponding images of microseismic events.

18 Claims, 6 Drawing Sheets

(56) References Cited

U.S. PATENT DOCUMENTS

| | | | |
|---|---|---|---|
| 6,868,037 | B2 | 3/2005 | Dasgupta et al. |
| 7,127,353 | B2 | 10/2006 | Geiser |
| 7,512,034 | B2 | 3/2009 | Haldorsen |
| 7,660,194 | B2 | 2/2010 | Uhl et al. |
| 2006/0077757 | A1 | 4/2006 | Cox et al. |
| 2011/0203846 | A1 | 8/2011 | Degrange et al. |
| 2011/0255371 | A1* | 10/2011 | Jing et al. ......................... 367/73 |
| 2014/0076543 | A1* | 3/2014 | Ejofodomi et al. ........ 166/250.1 |

OTHER PUBLICATIONS

Seismic While Drilling for Geophysical Exploration in a Geothermal Well Poletto et. al., Enhanced Abstracts, Society of Exploration Geophysicists Annual Convention, San Antonio, TX, Oct. 2011.

Seismic While Drilling for Geophysical Exploration in a Geothermal Well Poletto et. al., Geothermal Resources Council 2011 Annual Meeting, San Diego, CA, Oct. 2011.

U.S. Appl. No. 13/070,442, filed Mar. 21, 2011, Geiser.

U.S. Appl. No. 13/302,009, filed Nov. 22, 2011, Geiser.

* cited by examiner

TOMOGRAPHIC IMAGING OF FRACTURE-FAULT PERMEABILITY ZONES DURING DRILLING OPERATIONS

RELATED APPLICATIONS

This application is a continuation-in-part of, and claims priority and other benefits from, U.S. patent application Ser. No. 13/302,009 filed Nov. 22, 2011 entitled "Using a drill bit as a seismic source for SET velocity analysis" to Geiser, (hereinafter "the '009 patent application",) the entirety of which is hereby incorporated by reference herein.

FIELD

Various embodiments described herein relate to the field of microseismic data acquisition and processing, and devices, systems and methods associated therewith.

BACKGROUND

In recent years, it has become apparent that large reserves of hydrocarbons are to be found in what are referred to as "unconventional" oil and gas bearing geologic layers. These unconventional layers, which include rock types such as shales, are typically not highly permeable, and therefore present formidable obstacles to production. The most common technique in use today that permits commercial production of natural gas and oil from such layers is hydraulic fracturing, also referred to as "fracing" or "fracking". This technique can be also be applied to older wells drilled through conventional hydrocarbon-bearing layers to increase the proportion of hydrocarbons that can be extracted from them, thus prolonging well life.

The progress of a fracturing operation must be monitored carefully. Well fracturing is expensive, and the fracturing process is done only when the expected resulting increase in production is significant. The high pressures associated with fracturing result in new fractures that may follow existing faults and fractures, which can result in an uneven or unpredictable fracture zone. Fracturing fluid may also begin following an existing fault or fracture zone and then propagate beyond the intended fracture zone. If the induced fracturing grows out of the target horizon it can contact nearby water bearing layers so that the well is ruined by water influx. If the induced fracturing grows out of zone the well may be ruined both because the target horizon is not stimulated or because the produced hydrocarbons leak off.

Knowledge of the actual induced fracture size, location, shape etc. provides valuable data for designing better fracturing operations and provides for better reservoir simulations. Care must also be taken not to interfere with existing oil or gas production wells in the area. For these and other reasons, it is important that the that the operator planning the fracturing operation be able to accurately predict where the injected fluid will go.

Among other things, what is required are means and methods for determining the natural permeability and fracturing of geologic layers and zones of potential fluid loss before hydraulic fracturing is undertaken to plan where hydraulic fracturing should be performed, and in which zones hydraulic fracturing should be avoided.

SUMMARY

In one embodiment there is provided a method of identifying faults and other natural or induced fractures proximate a well bore during a drilling operation, comprising: recording, over first periods of time, a first microseismic data set during the drilling operation; recording, over second periods of time, drill bit positions, and times corresponding to the drill bit positions in the well bore during the drilling operation to form a second drill bit position and time data set; correlating times corresponding to the first microseismic data set with the second drill bit position and time data set; processing the first microseismic data set at a plurality of selected times and locations to image microseismic events associated with or arising from the drilling operation, and identifying permeable features proximate the well bore from the microseismic event images.

In another embodiment there is provided a method for monitoring the progress and success of a cementing operation and verifying the integrity of cementing in a well bore comprising: recording microseismic data during a cementing operation; recording times and positions corresponding to such times of a cement slug in a well bore during the cementing operation; processing microseismic data at a plurality of selected times and locations proximate the well bore to image microseismic events and identifying faults and other natural or induced fractures associated with the cementing operation from images of microseismic events.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

In the drawings, some, but not all, possible embodiments are illustrated, and further may not be shown to scale.

For the first 100 years and more of oil exploration and production, vertical wells were drilled almost exclusively in geologic layers that permitted production of oil and gas flowing under the natural pressures associated with the layers. Such production required that two physical properties of the geologic layer fall within certain boundaries. The porosity of the layer had to be sufficient to allow a substantial reserve of hydrocarbons to occupy the interstices of the layer, and the permeability of the layer had to be sufficiently high that the hydrocarbons could move from a region of high pressure to a region of lower pressure, such as when hydrocarbons are extracted from a layer via a well. Typical geologic layers having such properties include sandstones.

Where the permeability of the geologic layer was low, it was necessary to drill multiple wells close together, to extract hydrocarbons from the entire extent of the geologic layer. As the technology evolved, it became possible to drill multiple wells from closely clustered starting locations, and steer the drill bit in different directions out from the starting point. The angle at which a drill bit could be steered, and hence the possible deviation of the well, has progressively increased.

In recent years it has become apparent that huge reserves of oil and gas are to be found in geologic layers that have low permeability. These reserves often occur as shales and other rocks in which the hydrocarbons were originally formed. "Conventional" drilling targets reservoir rocks, where oil and gas has seeped from the source rocks and has accumulated. The new "unconventional" oil and gas exploration is aimed at the source rocks, with the goal of extracting the hydrocarbons that remain within the source rocks. This resource has the potential of doubling the world's hydrocarbon resource base. The problem is how to extract these reserves, because the oil or gas does not flow well through this type of low-permeability rock. Much of the production from unconventional reservoirs is adsorbed hydrocarbons, that is, hydrocarbons that are attached to solid phases such as kerogen or clays and so are not in the pore space. Work is underway to retort oil and gas in-place from kerogen. This latter method is an artificial maturation process. The hydraulic fracturing methods which will be described below are very relevant to such in-situ retorting.

New drilling methods have also been developed to recover these unconventional resources. Drilling technology is no longer limited to the drilling of vertical wells and has evolved to allow wells to be deviated, that is, the direction of drilling may be changed such that a well can be drilled along virtually any direction or azimuth, including horizontally. Such deviated wells are often drilled along specific geologic layers to increase production potential by increasing the extent of the well bore that is in contact with the hydrocarbon-bearing layer. The extent of a hydrocarbon-producing layer in a vertical well may be measured in feet, or perhaps tens or hundreds of feet in highly productive areas. The maximum area of the layer in contact with a vertical well bore is quickly computed as the circumference of the well multiplied by the height of the producing layer. In practice, the producing area is much less. By drilling horizontally or non-vertically through a layer, the extent of the layer in contact with the wellbore can be much greater than is possible with vertically-drilled wells. A horizontal well may extend for hundreds or thousands of feet through a hydrocarbon-bearing layer. However, in these unconventional geologic layers, such as gas shales, even this may not be adequate to ensure hydrocarbon production, because such layers have low permeability and the hydrocarbons do not flow to the well.

Oil and gas producers therefore developed the technique of hydraulic fracturing. Hydraulic fracturing involves pumping fluid under very high pressure into hydrocarbon-bearing rock layers to generate artificial fractures and increase the conductivity of natural fractures already present in the rock and thereby increase significantly the total volume of the subsurface from which the hydrocarbons can be extracted, allow the hydrocarbons residing therein to flow more freely and provide pathways for the hydrocarbons to migrate to the vertical well and hence to the surface. Usually the fluids injected into such layers contain chemicals to improve the flow of the fracturing fluid or the hydrocarbons, and may contain "proppants" (an industry term for substances such as sand.) When the fracturing fluid is removed, and the hydrocarbons are allowed to flow towards the vertical well and the surface, the sand grains prop open the fractures and prevent their collapse, which might otherwise quickly stop or reduce the flow of hydrocarbons.

Some fracturing processes require large quantities of water and sand. Other techniques use foam (nitrogen/water/foaming agent that is typically 96%-98% nitrogen) or 100% pure gas such as nitrogen, $CO_2$ or propane. The process has to be monitored closely in order to make sure that the fracturing is effective, and that the fracturing is confined to the intended geologic layer. Because of the extremely high pressures involved, the fracturing fluids may expand existing faults and fractures, leading to a loss of fluid, a drop in pressure, and an incomplete fracturing operation. The present method assists in determining the location, spatial extent, permeability and degree of fracturing and faulting before the fracturing begins, so that the fracturing may be designed to optimize production and avoid potentially hazardous zones.

Seismic surveys are frequently used to locate potential sources of oil and gas, estimate recoverable reserves, and select optimal drilling locations. The method of seismic surveying that has been used for many years involves generating seismic energy at or proximate to the surface of the earth using explosive, impact, or vibrating sources of seismic energy. The rise of new methods of seismic surveying has resulted in this approach being referred to as "conventional seismic" surveying, or sometimes as "surface seismic" surveying. It may also be referred to as "reflection seismic" surveying, because it relies on the fact that sound waves generated by seismic sources are reflected back to the surface at each interface between different geologic layers. These reflections arise because the velocity of the seismic waves through the different geologic layers varies. The change in the velocity of the seismic waves results in some of the seismic energy being reflected back towards the surface. Sensors on or proximate the surface of the earth detect the reflected seismic energy, which is recorded in digital form for data processing and analysis.

Once the exploitation of the oil and gas reserves has begun, the conventional seismic survey may be repeated periodically to monitor the development of the oil and gas resources. It is not uncommon for a seismic survey to be conducted before the hydraulic fracturing begins, and then the survey repeated upon completion of the fracturing. A conventional seismic survey provides information about the properties of geologic layers in the subsurface. Analysis of how these properties have changed assists in evaluating the effectiveness of the fracturing process. An additional benefit is that it is possible, and indeed a necessary step in processing the conventional seismic data, to derive information about the velocity of seismic waves through different geologic layers.

Although much information about the subsurface may be obtained through the use of conventional seismic surveys, there are many reasons why this type of seismic survey is not suited for monitoring hydraulic fracturing operations. Conducting a seismic survey is expensive, and there may be other problems, including limited access to surface locations at which seismic sources may be activated, environmental costs and remediation costs. One major reason why conventional seismic surveys are not used in hydraulic fracturing is that is impractical to monitor the progress of the hydraulic fracturing operation in close-to-real-time. It takes considerable time to collect the data for a seismic survey, and more time to process the data to provide a useful image of the subsurface.

Further, conventional surface seismic reflection surveys generally do not work well for monitoring the movement or positions of fluid fronts in the subsurface. The physical dimensions of fractures are much shorter, often in the order of a few feet, than can be detected using conventional surface seismic reflection techniques. Furthermore, within a given geologic layer there may be no contrasts or only low contrasts in seismic velocity, and as a result surface seismic reflection techniques cannot be used effectively to image fractures within the layer. Fractures tend to scatter seismic energy, further complicating their detection by conventional surface seismic reflection surveying techniques. A different method monitoring the hydraulic fracturing and the movement of the fracturing fluid through the geologic layers is needed.

In recent years the branch of geophysics known as "microseismic" or "passive seismic" has undergone rapid growth and transformation. The science has its origins in earthquake seismology and in technology developed to monitor nuclear tests. Many of the techniques developed for these purposes have been adapted and expanded in order to address the problem of imaging fractures or expanding fluid fronts and fluid pressure waves within geologic layers during the process of hydraulic fracturing. Instead of using "active" surface seismic energy sources, "passive seismic" techniques detect seismic energy generated in the subsurface of the earth by the movement of faults or opening of new fractures or slip along existing fractures. In some embodiments seismic energy is emitted during fracturing of a geologic layer by the injection of high pressure fracturing fluid into the layer. This seismic energy is sensed and recorded by sensors on or proximate the surface of the earth. The recorded data are then processed and analyzed to determine the point of origin of the emitted seismic energy, and thus define the location of the fracture.

One method of using microseismic data for locating faults and other types of fractures, streaks of high-permeability rocks, and other permeable features in geologic layers is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent",) and in U.S. Pat. No. 7,127,353 to Geiser entitled "Method and apparatus for imaging permeability pathways of geologic fluid reservoirs using seismic emission tomography" (hereafter "the '353 patent",) the disclosures of which are hereby incorporated by reference herein in their respective entireties. The SET process converts the recorded microseismic data into a format suitable for display and interpretation, and thus enables "Tomographic Fracture Imaging" or "TFI™". TFI™ is described in detail in U.S. patent application Ser. No. 13/070,442, filed on Mar. 23, 2011, entitled "Fracture Imaging Methods Employing Skeletonization of Seismic Emission Tomography Data" to Geiser, (hereinafter "the '442 patent application",) the entirety of which is hereby incorporated by reference herein. TFI™ is a method for further processing the SET data using methods derived from empirical observations on fracture/fault geometry in relationship to the role that crack density and fracture propagation have on the emission of seismic energy.

The SET process comprises recording microseismic data using an array of sensors, located on or proximate the surface of the earth, in a well that is to be fractured, in another well or wells, or in one or more boreholes drilled for the purpose of placing sensors. Data are recorded at sensor locations in a digital format as a time series, referred to as a "trace," over a given time period. The duration of recording and the sampling interval are determined by the objectives of the microseismic data acquisition process, the characteristics of the events that generate the detected or sensed microseismic energy, the distances involved, the characteristics of the subsurface, and other factors.

Once the seismic data have been recorded, they must be processed and converted to a set of data values that represent useful information, and that information must be displayed in a readily understandable format. Examples of such displays may be found in the above-referenced '361 and '353 patents, where some SET data acquisition and processing techniques are described in detail. The data recorded at each sensor location are filtered and processed using SET processing techniques and software, some of which are described in the '361 and '353 patents, that convert the data into a series of gridded subsurface volumes corresponding to multiple time samples. The values of the points in the grid represent attributes of the data, and such values vary over time as the energy emitted at each point in the subsurface varies.

In at least some SET techniques and processes, the subsurface of the earth is subdivided into a 3D grid, and the cells in the grid are referred to as "voxels". A "voxel" or "volume element" is the 3D equivalent of a 2D "pixel" or "picture element". According to some embodiments of the SET method, the subsurface is divided into a 3-Dimensional grid with a grid element or voxel size sufficiently fine to provide the degree of resolution required, usually about a few meters. While various different algorithms may be used to transform the acquired data, the end result is typically the same: a series of SET spatial volumes are produced, where each SET spatial volume is associated with a given data subset, and each data subset corresponds to a set of time windows comprising a time interval. The values corresponding to the voxels within the spatial volume represent the amount of energy emitted from each voxel during a given a set of time windows comprising a time interval. The changes in amount of energy emitted within the spatial volume from one time window to the next allow the fracturing to be monitored in close to real time.

In various embodiments of the SET method, the energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art.

As recorded, the microseismic data traces recorded at each sensor location correspond to the microseismic energy reaching that sensor location from multiple points of origin in the subsurface of the earth. The objective of the microseismic data processing is to determine the points in the subsurface and the time at which this microseismic energy originated. Unlike conventional seismic data, which uses a controlled energy source at a known location that is activated at a known time, microseismic data originates at a point of fracture in the subsurface at an unpredictable time. A considerable extent of the subsurface is under pressure from the hydraulic fracturing fluid, and therefore multiple fractures may occur at different locations but close in time. Further complicating the analysis is the difficulty of distinguishing microseismic energy emitted close to the surface just a short time before it reached the sensor from microseismic energy emitted deeper in the subsurface at an earlier time. The latter takes longer to reach the sensor, so it may arrive at the same time as energy from a later, shallower origin might arrive.

The solution to this problem involves projecting back the microseismic energy to multiple possible points of origin in the subsurface. A microseismic event such as a fracture emits energy that is detected and recorded at multiple sensors. Using various algorithms, some of which are described in the '361 and '353 patents, the microseismic data recorded at multiple sensor locations are projected back to possible points of origin. If microseismic energy was emitted from a given point in the subsurface, then the data tend to add constructively at that point. If no energy was emitted from a given point in the subsurface, then the data cancel out.

According to some embodiments of the SET process, each point in the subsurface grid is treated as if it is a possible source of microseismic energy. Using a known or estimated seismic velocity model, it is possible to compute the time a release of energy at a point at a given depth in the subsurface takes to reach each sensor on or proximate the surface, where it is recorded as part of the seismic data trace for the sensor. Knowing this time, it is possible to take the seismic data trace recorded at a sensor, and apply a time shift to it, such that the result is a seismic data trace corresponding to what might have been recorded at the point in the subsurface at which the energy was emitted.

Data traces recorded at multiple sensor locations are shifted in time so that the traces correspond to the seismic energy which may have been emitted from a point in the subsurface. The process is repeated for every sensor within a predetermined range from the point in the subsurface, such that if there a N sensors within this range, there are N seismic traces corresponding to the data that would have been recorded by a sensor located at the point in the subsurface at which the energy was emitted. These N seismic traces are summed or "stacked," or their semblance is computed. If an actual microseismic event did occur at this point in the subsurface, then the N seismic traces add constructively to show a high value for the stacked output, or the N seismic traces show a high degree of similarity as shown by a high semblance value.

If the time shifts applied to each of the N seismic traces are not optimal, then the traces do not align correctly and the microseismic events may not be detected. The accuracy of the time shifts depends on the accuracy of the information about the velocities at which the seismic energy travels through the geologic layers from the source of the microseismic event up to the surface. The velocity is different for each geologic layer through which the seismic energy travels. The velocity may also vary within a geologic layer, both vertically and laterally. Even a relatively small error in the velocity data may result in the microseismic event being undetectable.

Microseismic data processing and interpretation present greater challenges than conventional seismic data. First, the signals are very much weaker than in the case of a conventional seismic source, and microseismic events are often hidden in the noise. The fracturing operation may be performed deep in the subsurface, frequently at a depth of 2,000 to 12,000 feet. The fractures created in the geologic layers are small. It follows that the level of the seismic energy received at the sensors proximate the surface of the earth is very low. The microseismic events can only be detected by summing or stacking multiple seismic traces, or looking for similarities between traces by computing the semblance. Second, the time at which the seismic energy was emitted is not known. When a microseismic event is detected, the question arises as to whether this is a recent event from near the surface of the Earth, or an event which occurred much deeper in the Earth some time previously, possibly several seconds previously. Techniques such as SET processing have been developed to resolve this question.

In SET processing, each element of the subsurface grid is evaluated to determine the locations of microseismic events. Such an analysis takes time and computing power, in part because the times at which the microseismic events are unpredictable, and therefore it is necessary to record and process data over some period of time. This time may be minutes, hours, or days. When a fracturing operation is taking place, the subsurface area of interest may be restricted to a zone centered about the segment of the well being fractured, and the time of the recording may be limited to the duration of the fracturing operation. This still requires scanning through a large amount of data looking for microseismic events and determining their times and spatial locations, but does make the process more efficient.

Some of the complexity in identifying microseismic events in the subsurface may be reduced if information is already known about the velocity characteristics of the subsurface. This information may be available from other geophysical measurements made during the surveying of the areas and drilling of the well. It is possible to use velocity data obtained from a conventional seismic survey when processing microseismic data. In practice this data may not always be available, or may lack the spatial resolution required to account for local variations in the velocities of the seismic waves in different geologic layers. Other methods of determining the velocities of seismic waves through the geologic layers include recording during the "perf shots," that is, when small explosive charges are detonated inside the well casing to perforate it and allow the outward flow of hydraulic fracturing fluid and the inward flow of hydrocarbons. A similar technique uses small charges known inside the well bore, known as "string shots." These methods are limited to sources at a few locations within the well bore, and are only possible at limited times during the drilling process. It is also possible to use velocity data obtained from well logs, but these data are limited to the volume of the subsurface proximate the well bore.

Ideally, the velocity model of the subsurface used for processing microseismic data should be derived using microseismic processing techniques, thus optimizing the results of the microseismic data processing. One method of determining the velocity information is to process the microseismic data using many possible combinations of time, spatial location and velocity information, in order to find which combination most effectively images the microseismic events. This approach is time-consuming, precluding its use when the fracturing operation is in progress and results are needed in close to real time. Further, because the velocity of the seismic energy varies vertically and horizontally with the different geologic layers, and sometimes by azimuth, estimates must be made of the velocity at multiple points in the subsurface in order to compute the travel time of the seismic energy to a sufficient level of accuracy.

The '009 patent application shows that it is possible to compute a detailed and accurate model of the velocities of the seismic waves through the subsurface, before the fracturing operation is begun. This may be done using the noise generated by the drill bit as the well is being drilled. During the drilling operation, the location of the drill bit is known precisely at all times. Thus, the spatial position and the time of the source of the seismic energy are removed as variables. The seismic energy from the drill bit is recorded, and processed using SET with an initial velocity estimate. For a given time, if the velocity estimate is accurate, the recorded energy will image at the known position of the drill bit. If it does not image correctly, the velocity model is adjusted to obtain the best fit. The process is repeated at slightly greater depth for the drill bit, using the previously determined velocity model as a starting point, and the velocity for the additional depth increment is determined. This allows a velocity model to be determined accurately for the entire well. Further, the velocity information is available when the fracturing operation begins. Ideally, the velocities used for processing the microseismic data should be computed from the surface all the way down the wellbore. As the well bore is drilled horizontally, there is an opportunity to analyze the horizontal variation of the velocities of the seismic waves in the geologic layers above the horizontal well bore. Computing velocity information using the SET process assures that the velocity information is optimized for this technique, and can be applied to SET processing of the microseismic data recorded during the hydraulic fracturing process.

It should be noted that the collection of data and the computation of velocity information with a drill bit as a seismic source using conventional surface seismic recording and processing techniques, as distinct from microseismic techniques, has been described previously. See *The use of drill-bit energy as a downhole seismic source*, J. W. Rector, III and B. P. Marion, Geophysics, Vol. 56, No. 5 (May 1991) p. 628-634. See also *Seismic While Drilling for Geophysical Exploration in a Geothermal Well*, Poletto et al., Enhanced Abstracts, Society of Exploration Geophysicists Annual Convention, San Antonio, Tex., October 2011, and *Seismic While Drilling for Geophysical Exploration in a Geothermal Well*, Poletto et al., Geothermal Resources Council 2011 Annual Meeting, San Diego, Calif., October 2011.

The usual definition of "hydraulic fracturing" refers to the deliberate process of fracturing rocks by injecting fluids ((liquids, gases, supercritical fluids or mixtures thereof) at very high pressure. This is normally done to increase permeability and allow the recovery of hydrocarbons from these rocks. Microseismic techniques may be used to monitor the progress of the hydraulic fracturing operation. The present method, however, uses microseismic techniques such as SET earlier in the process, during the drilling operation. It should be noted that the present method does not rely on imaging the noise from the drill bit. During drilling, fluids are pumped into the well bore. These serve several purposes, including lubricating the drill bit, removing debris and cuttings from the drilling surface, and preventing high pressure oil or gas from entering the well bore and reaching the surface. Such fluids, often known as drilling mud, are heavy, and a column of thousands of feet of drilling fluids exerts considerable pressure on the well bore. The fluids are kept under additional pressure in order to prevent a "blow out". Although the pressures used during drilling are not as high as those used in a planned hydraulic fracturing operation, they may be sufficient to cause fracturing or expand existing fractures and faults in some geologic layers. Such fracturing during drilling causes a release of seismic energy, which may then be detected and imaged.

It should also be noted that the present method does not image the fluids as they move into the surrounding geologic layers, nor does it image only the fractures caused by the fluid forcing apart the rocks. As the fluid breaks through into a permeable or fractured layer, it causes a pressure wave to expand outwards from the point of penetration, and this pressure wave may cause fracturing even at some distance from the location of the well and the fluid, especially in rocks that are already naturally fractured. The pressure increase does not just cause fracturing, it can generate microseismic energy by causing slip on pre-existing natural fractures. Fractures caused by this pressure wave and slip on pre-existing natural fractures may be imaged using the techniques described above, and in particular in the '361 patent and the '353 patent. According to some embodiments, such faults and other types of fractures, streaks of high-permeability rocks, and other permeable features may be imaged proximate the well bore, depending on the geology of the subsurface and the stresses present within the geologic formations, for distances of tens to hundreds of meters from the well bore.

Figure 1:
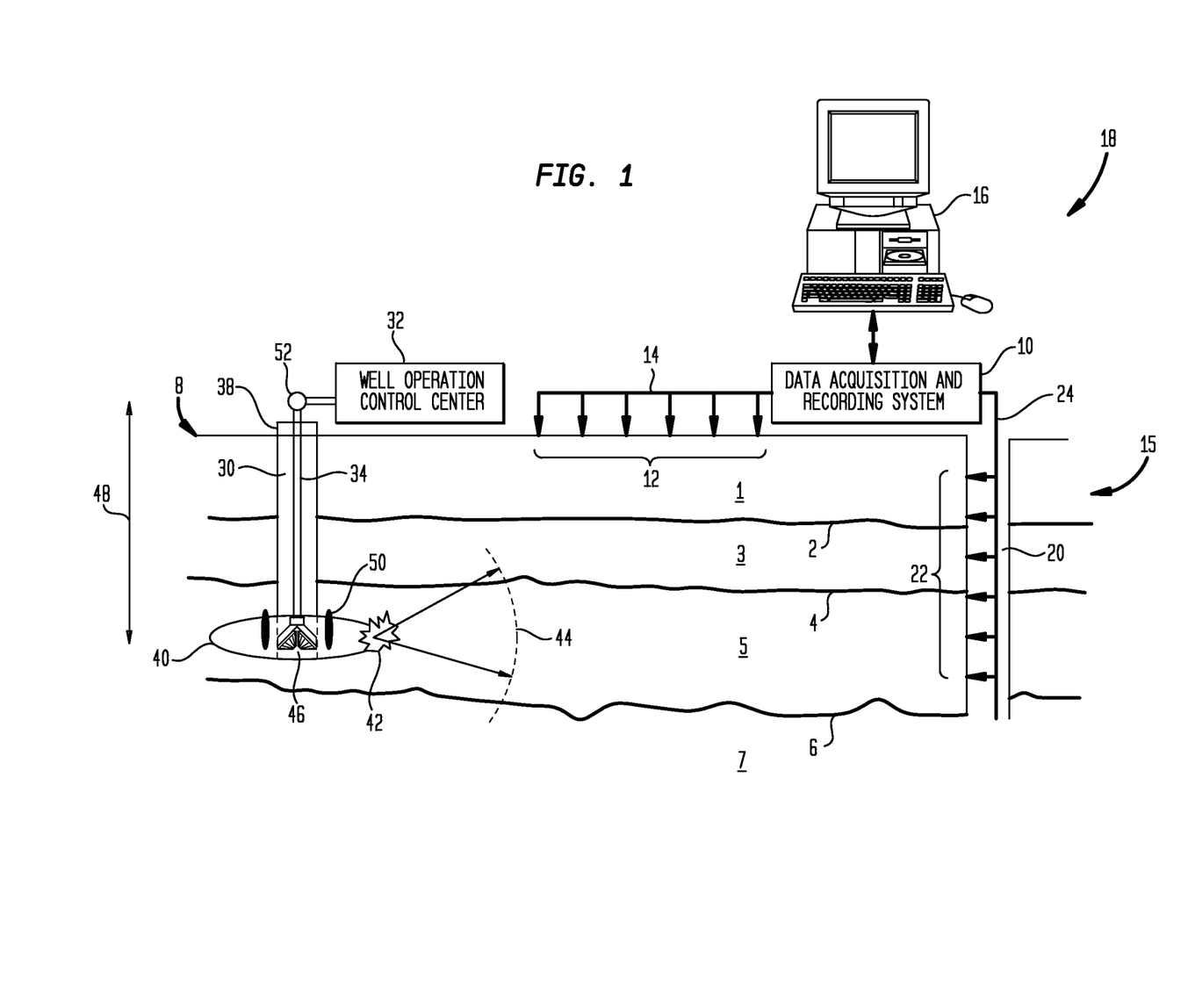
FIG. 1 shows one embodiment of a cross-sectional view of the earth and corresponding data acquisition, recording and analysis system 18.

FIG. 1 shows one embodiment of how microseismic data are acquired during a drilling operation. Depicted is a cross-sectional view of the earth in the vicinity of well bores 20 and 30, including geologic layers 1, 3, 5, and 7, with interfaces 2, 4 and 6 between these geologic layers. Those of skill in the art will recognize that there are many such geologic layers and corresponding interfaces at any point in the earth. A drilling operation is in progress in wellbore 30. Drill bit 46 is shown at depth 48, which is measured during drilling from Kelly bushing 52. The time and corresponding location, including depth 48, of drill bit 46 are recorded during the drilling operation. In some embodiments the time and corresponding location of drill bit 46 are recorded substantially continuously. Under the control and direction of well operation control center 32, drilling fluid is pumped into wellbore 30 through pipe 34 to lubricate the drill bit, remove debris and cuttings and exert pressure within well bore 30 to prevent blowouts. The pressure in wellbore 30 is controlled primarily by the density of the drilling fluid, which is continuously adjusted and monitored.

As shown in FIG. 1, at depth 48 geologic layer 5 has zones 50 that contain naturally occurring fractures. The pressure exerted by the weight of the drilling fluid forces drilling fluid out of wellbore 30 into hydrocarbon producing geologic layer 5 at depth 48 of drill bit 46. As the drilling fluid flows outwardly 40 from wellbore 30 and into geologic layer 5, the high pressure fluid may penetrate and enlarge fractures in surrounding geologic layer 5, resulting in one or more releases of seismic energy 44 at point of fracture 42. In addition the high pressure of the drilling fluid creates a fluid pressure wave that propagates along pre-existing fractures that form a permeability field, perturbing the ambient stress field, causing failure. This failure illuminates the natural permeability pathway of geologic layer 5, allowing it to be imaged according to the methods described above and in the '353 patent. Seismic energy 44 propagates through subsurface 15 of the earth through geologic layers 1, 3, 5, and 7 as a series of acoustic wavefronts or seismic waves. Seismic wavefronts and energy 44 emitted at point of fracture 42 caused by the fracturing of geologic layer 5 by the drilling fluid are sensed by surface sensors 12 disposed along surface 8 and/or downhole sensors 22 disposed in well bore 20 and converted into electrical, optical, magnetic, radio and/or other analog or digital signals. The electrical, optical, magnetic, radio and/or other analog or digital signals generated by surface sensors 12 and downhole sensors 22 in response to sensing seismic energy or wavefront 44 are representative of the detected or sensed seismic energy, and are recorded as data by acquisition and recording system 10.

As further shown in FIG. 1, data acquisition, processing and interpretation/analysis system 18 comprises surface sensors 12 and/or downhole sensors 22 operably connected to data acquisition and recording system 10, and data processing computer 16 operably connected to data acquisition and recording system 10. Note that FIG. 1 shows only one of many possible embodiments of system 18 for acquiring, processing and interpreting/analyzing microseismic data in a well setting. According to one embodiment, data may be recorded, processed and analyzed or interpreted while drilling is occurring, thereby permitting near-real-time monitoring of the drilling process.

Data acquisition and processing configurations other than that shown in FIG. 1 may be employed. For example, only surface sensors 12 may be employed or only downhole sensors 22 may be employed, and downhole sensors may be employed in vertical well bore 30 in addition to or instead of in well bore 20. Seismic sensors 12 and 22 may be deployed along surface 8 and in well bore 20 and/or vertical well bore 30. Any suitable combination of surface sensors 12 and/or downhole sensors 22 may be employed. By way of example, sensors 12 and 22 may comprise one or a plurality of sensors, or arrays of sensors, and may be geophones, accelerometers, piezoelectric sensors, hydrophones, or any other suitable acoustic sensor. Note further that sensors 12 and/or 22 may be 1-, 2- or 3-mutually-othogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22.

Downhole sensors 22 may be cemented in place permanently in well bore 20 or vertical well bore 30, and thereafter used to acquire data for multiple projects. Downhole sensors 22 may also be lowered into well bore 20 on wireline or cable 24. The electrical, magnetic or optical signals generated by sensors 12 and/or 22 are transmitted to data acquisition and recording system 10 by cable 14 and wireline or cable 24. In other embodiments, signals generated by sensors 12 and/or 22 are transmitted by wireless transmitters to a wireless receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Surface sensors 12 may be arranged as shown in FIG. 1, in a substantially linear configuration extending from the well in one direction. Surface sensors 12 may also be deployed in a radial pattern centered on vertical well bore 30. Further, surface sensors 12 may be arranged in a 2-dimensional grid on or proximate to surface 8. The grid may be positioned to enable the acquisition of data from surface sensors 12 surrounding vertical well bore 30. In other embodiments, the grid of surface sensors 12 may be located on or proximate to surface 8 and above the intended path of one or more horizontal wells.

Downhole sensors 22 may be located as shown in FIG. 1, in one well bore 20 drilled for the purpose of emplacing sensors, or an abandoned well bore 20. According to other embodiments, downhole sensors 22 may be placed in a plurality of well bores 20, arranged in a radial pattern around vertical well bore 30, or in a pattern designed to enable the collection of microseismic data in the area around vertical well bore 30, or from planned horizontal wells.

Note further that system 18 may be employed in land, marine, off-shore rig, and transition zone settings. In addition, multiple data processing computers 16 may be employed, and/or multiple data acquisition and recording systems 10 may be employed.

Other embodiments include but are not limited to, the recording of the seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 is typically, although not necessarily, in the form of digitally sampled time series referred to as seismic traces, with one time series or seismic trace for each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

Various techniques well known in the art may be employed to improve the quality of the microseismic data. These include filtering to remove noise from external sources such as pumps, oilfield equipment, traffic, and other noise sources. In the present method, filtering techniques known in the art may be used to reduce the effect of the noise from the drill bit.

According to some embodiments, a first microseismic data set is recorded substantially continuously over first periods of time from before the drilling operation begins until after it is complete and microseismic activity resulting from the drilling operation has ceased. In other embodiments, a first microseismic data set may be recorded over first periods of time at intervals during the drilling operation, the intervals being determined by the rate of progress of the drill bit. Drilling rates are typically measured in feet per minute, or feet per hour. Drilling rates can reach 6 feet or more per minute, but are typically in the 1-2 feet per minute range.

In some embodiments, drill bit positions and times corresponding to the drill bit positions in the well bore during the drilling operation are recorded at second periods of time to form a second drill bit position and time data set. The times of the first periods of time for the microseismic data set and the second periods of time for the drill bit position and time data set may be correlated. In order to process the microseismic data to image microseismic events associated with or arising from the drilling operation, it is then possible to select subsets of the microseismic data at the times corresponding to selected drill bit positions.

According to some embodiments, the microseismic data are processed for spatial locations surrounding locations of drill bit 46, but not at the exact location of drill bit 46. Processing at the drill bit location would repeat the imaging of drill bit 46 as described in the '009 patent application, rather than showing fractures and faults in the geologic layers 1, 3, 5 and 7 surrounding well bore 30.

Figure 2:
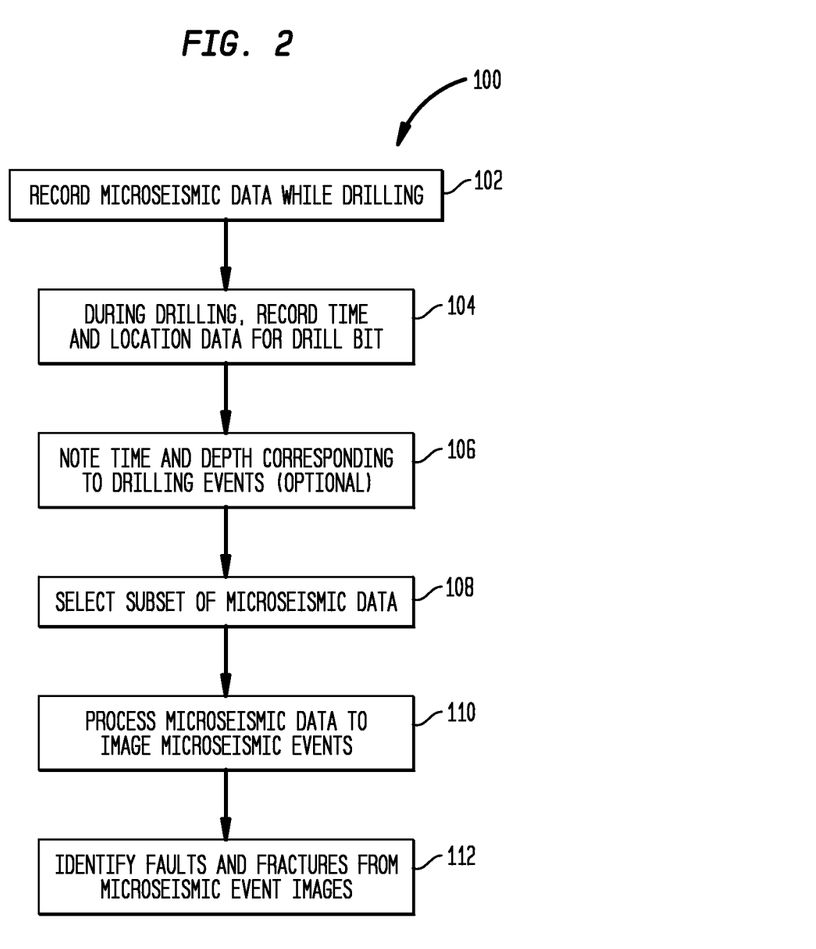
FIG. 2 shows a one embodiment of the present method as a flow diagram.

FIG. 2 shows one embodiment of the present method as flow chart 100. At step 102, microseismic data are recorded in the vicinity of well bore 30 while drilling is in progress, and optionally for some time thereafter. At step 104, positions and corresponding times for drill bit 46 are also recorded during the drilling process. Optionally, at step 106, events occurring during the drilling process are noted, with the corresponding position and time for drill bit 46. Such events may include a sudden drop in pressure, loss of drilling fluid, or a change in the rate of drilling caused by a change in the properties of the rocks in well bore 30. At step 108, a subset of the microseismic data is selected. This subset may correspond to predetermined time increments, predetermined position increments, or a predetermined set of times and position pairs. The subset of the microseismic data may optionally correspond to a drilling event noted at step 106. At step 110, the microseismic data are processed to image microseismic events in the subsurface proximate the well bore. At step 112, faults and other types of fractures, streaks of high-permeability rocks, and other permeable features in the subsurface are identified from the display of the processed microseismic data. Steps 108-112 are repeated as necessary to image the portion of wellbore 30 of interest.

Additional steps may be performed according to other embodiments of this method, including filtering to enhance the quality of the microseismic data, filtering to remove organized noise, and other signal enhancements which will be understood by those skilled in the art after reading this specification. These additional steps may be performed before, concurrent with or after any of the steps shown in FIG. 2. Further, the order of some of the steps shown in FIG. 2 may be changed, as those skilled in the art will understand after reading this specification.

Figure 3:
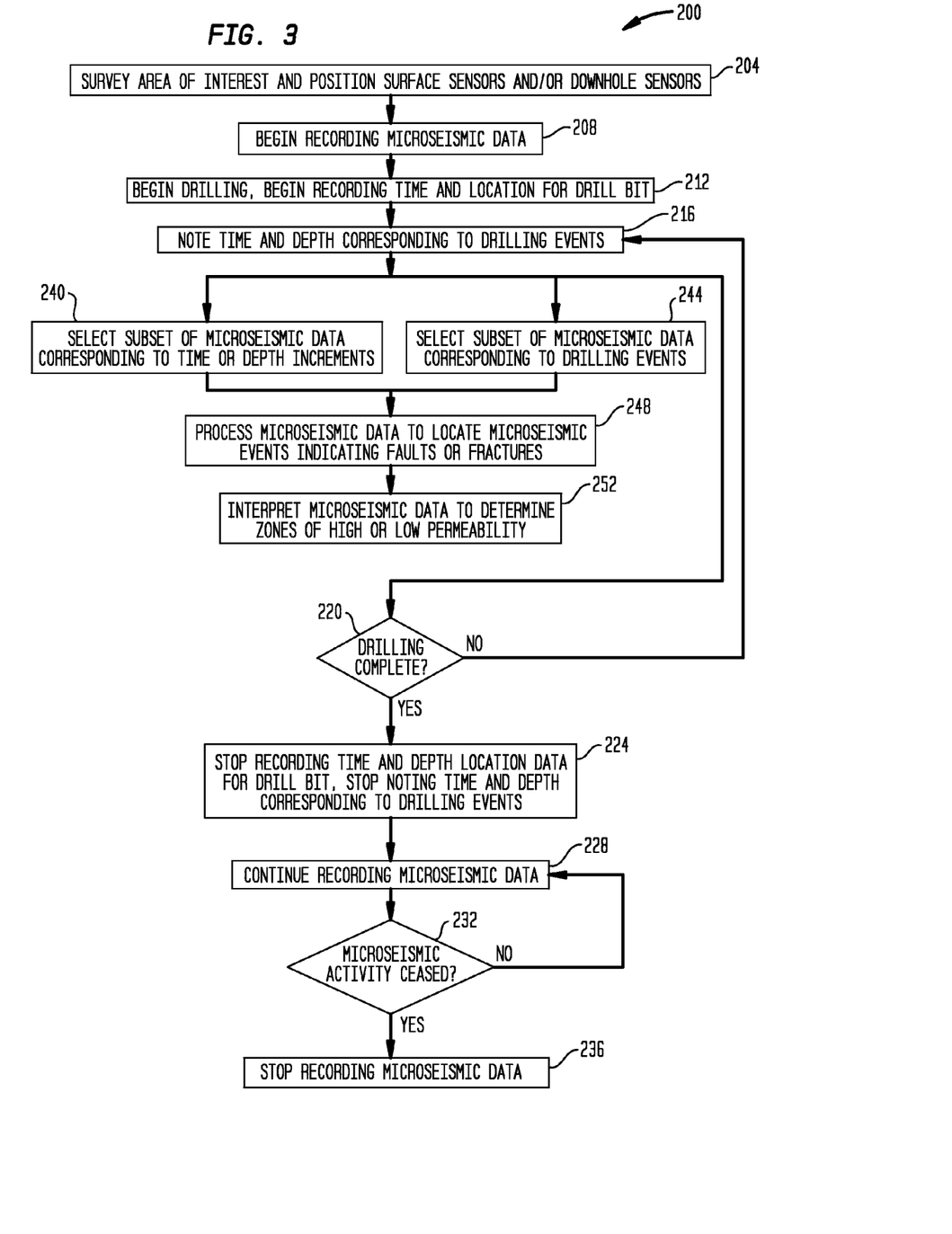
FIG. 3 shows another embodiment of the present method as a flow diagram.

FIG. 3 shows an embodiment of the present method as a detailed flow chart 200. At step 204, the area around well bore 30 is surveyed and surface sensors 12 and/or downhole sensors 22 are placed in appropriate locations and connected to data acquisition, recording and analysis system 18. At step 208, operators of data acquisition, recording and analysis system 18 begin recording microseismic data. At step 212, drillers and engineers begin the process of drilling well bore 30. While drilling is in progress, a record is made of the time and the corresponding drill bit 46 location. Such a record may be made at intervals, and in some embodiments will be substantially a continuous record. At step 216, the time and corresponding drill bit 46 location are noted for any event occurring during drilling, such as a sudden drop in pressure, loss of drilling fluid, or a change in the rate of drilling caused by a change in the properties of the rocks in well bore 30.

Other types of data are also collected during drilling, such as logs of drilling fluid density (commonly called "mud weight") and drilling fluid injection rates and loss rates. Mud logs may show gas in the drilling fluid, which is important because it signals flowing zones and permeable zones. Other drilling records are important, because high or low pressure pulses from swabbing (pistonnage) or the start-up of turbo drills can cause induced fracturing that microseismic techniques may be able to detect and image. Knowledge of such fracturing events constitutes an earth stress measurement, which is in itself valuable. The present method provides a better way of making such stress determinations because it may be possible to uniquely identify when such fracturing events occur from the drill bit locations and times and corresponding microseismic times. Also, Log-While-Drilling (LWD) log data, especially image log data, may be very helpful in conjunction with this method. LWD image logs may directly image natural fractures as the bit drills through them. It is then possible to use the LWD image to associate a natural fracture with a fluid loss event, and then observe the flow of fluid away from well bore 30 by imaging any microseismicity associated with the fluid movement.

At step 220, drilling continues until the well reaches its target location, and then at step 224 recording of the times and corresponding drill bit 46 locations is stopped. At step 228, even though drilling has ceased, there may still be microseismic activity as a result of the drilling operation, and therefore recording of the microseismic activity is continued. At step 232, operators of data acquisition, recording and analysis system 18 determine whether microseismic activity has ceased. If it has, microseismic data recording is terminated at step 236.

Still referring to FIG. 3, at step 240, a subset of the data is selected corresponding to a time and drill bit location and the microseismic data are processed using SET or other techniques to image the subsurface. The subsets of data may be selected at predetermined time or depth increments, or at time and depth increments selected to adequately sample the subsurface, depending on the rate of drilling, depth, thickness of geologic layers and other factors which will be understood by those skilled in the art after reading this specification. As shown at step 244, subsets of the data may also be selected and processed at times and depths corresponding to observed drilling events noted in step 216.

At step 248, the microseismic data are processed using SET as described in the '442 patent application to produce Tomographic Fracture Images. The Tomographic Fracture Images are used to image the subsurface and microseismic events are located within the processed data set. At step 252, the processed microseismic data are interpreted to determine characteristics and attributes of the subsurface, including permeability, the existence and locations of zones of natural and/or induced fracturing, and the existence and location of naturally occurring faults as discussed in the '442 patent application. Typically, clusters of microseismic events occurring close together in space and time are indicators of the release of microseismic energy 44 at points of fracture 42 or faulting in the subsurface.

Steps 240-252 may be performed while drilling continues or after drilling has ceased. Steps 240-252 are repeated as necessary to image the rock volume in areas of interest around wellbore 30, and at various times of interest. In some embodiments the same rock volume may be imaged at multiple different times.

Additional steps may be performed according to other embodiments of this method, including filtering to enhance the quality of the microseismic data, filtering to remove organized noise, and other signal enhancements which will be understood by those skilled in the art after reading this specification. These additional steps may be performed before, concurrent with or after any of the steps shown in FIG. 3. Further, the order of some of the steps shown in FIG. 3 may be changed, as those skilled in the art will understand after reading this specification.

Figure 4:
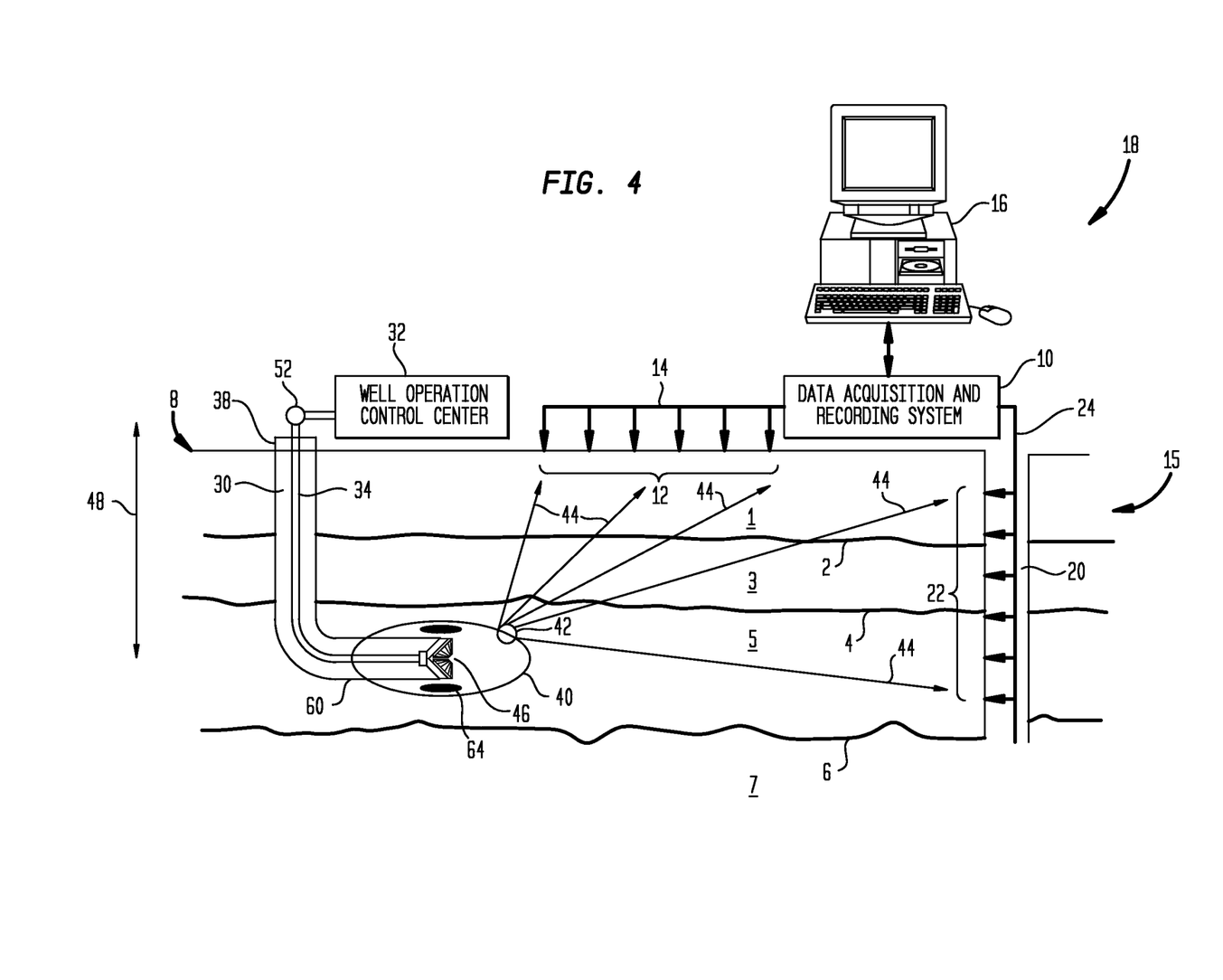
FIG. 4 shows microseismic energy being recorded during horizontal drilling.

FIG. 4 shows one embodiment of a method for recording microseismic data during drilling operations to enable the identification of fractures, faults or other high-permeability features where drill bit 46 has been deviated to drill substantially horizontally along horizontal well bore 60. Drill bit 46 is shown drilling through geologic layer 5, generating seismic energy 44. Seismic energy 44 is detected by surface sensors 12 and/or downhole sensors 22 and recorded by recording system 10.

In some embodiments, the SET processing may be performed at predetermined depth or time increments, or predetermined horizontal distances from vertical well bore 30 along horizontal well bore 60. In other embodiments, the SET processing may be performed at varying time or location increments as required by the geology of the subsurface, including the composition of the geologic layers 1, 3, 5 and 7, and the thickness of each layer.

In yet other embodiments the SET processing may be performed at selected times corresponding to observed events in the drilling process. Such events may be indicators of zones of high permeability or natural fracturing, and include a sudden drop in the pressure of the drilling fluid as drill bit 46 enters a zone 50 of high permeability, a sudden loss of drilling fluid as drill bit 46 enters a zone 50 with extensive natural fractures, faults or faults or other high-permeability features, or the presence of gases in the drilling fluid. Another event that may trigger SET processing of the data at the corresponding time is a change in the rate of drilling, which indicates a change in the geology of the geologic layers penetrated by well bore 30.

In some embodiments, the microseismic data are processed at time or depth increments in order to determine a velocity model as described in the '009 patent application. Although the purpose of this processing is to image the drill bit and thus determine the correct velocity model, it is possible that the resulting images created during the velocity analysis may show signs of fractures or other features in the geologic layers proximate well bore 30. Based upon this observation, the microseismic data in the surrounding spatial volume may be further processed to further identify fractures and faults.

The ability to identify such zones 50 of high permeability or natural fracturing is helpful to the engineers, geologists or other personnel responsible for the well. Zones of high permeability may be good or bad, but in either case, they may need to be handled differently from other zones of low to normal permeability. If fluids tend to leak into zones 50 during drilling, then the same may happen during production of hydrocarbons. Such zones 50 may need cementing, or additional casing, or other measures to prevent the loss of production during the life of the well. Zones 50 may also have to be isolated from any planned hydraulic fracturing operations to ensure that the fracturing fluid does not leak away into zones 50 instead of reaching its intended target zone. It is also possible that fluids may leak into wellbore 30 during the drilling operation, which again signals that the properties of such a zone are different from those of the surrounding geologic layers.

Referring now to FIG. 4, there is shown an embodiment in which a drilling operation in which vertical well bore 30 has been deviated to drill a horizontal well bore 60 along geologic layer 5. In some embodiments horizontal well bore 60 may extend thousands of feet from vertical well bore 30. As drill bit 46 proceeds along geologic layer 5, it penetrates zones 64 within layer 5 of high permeability or natural fracturing, or intersects existing faults. The outward flow 40 of the drilling fluid under pressure into such zones 64 creatures fractures or enlarges natural fractures, or promotes slip on natural fractures, resulting in the release of seismic energy 44 at points of fracture 42. Seismic energy 44 travels through geologic layers 5, 3 and 1 to sensors 12 and 22, and is recorded by data acquisition, recording and analysis system 18.

The microseismic data are then processed to produce Tomographic Fracture Images of fractures and faults within layer 5, or identify microseisms and, in some embodiments, the focal mechanisms of these microseisms. In some embodiments, SET processing is use to create the TFI™ images of microseismic events. Other embodiments, including the identification of hypocenters of microseismic events, are disclosed herein or will become apparent to those skilled in the art after having read and understood the specification and drawings hereof. In some of these embodiments, the resulting images are examined for clusters of microseismic events that occur close together in space and time. Such events may indicate the points of origin of microseismic energy 44 released by fractures or faults as a result of the injection of the drilling fluid into such fractures or faults. Such events may also indicate the points of origin of microseismic energy released as drill bit 46 breaks through into a permeable or fractured geologic layer and the high pressure of the drilling fluid creates a pressure wave that propagates outwards from well bore 30, causing fracturing and fracture slip beyond the zone where the drilling fluid has penetrated.

Figure 5:
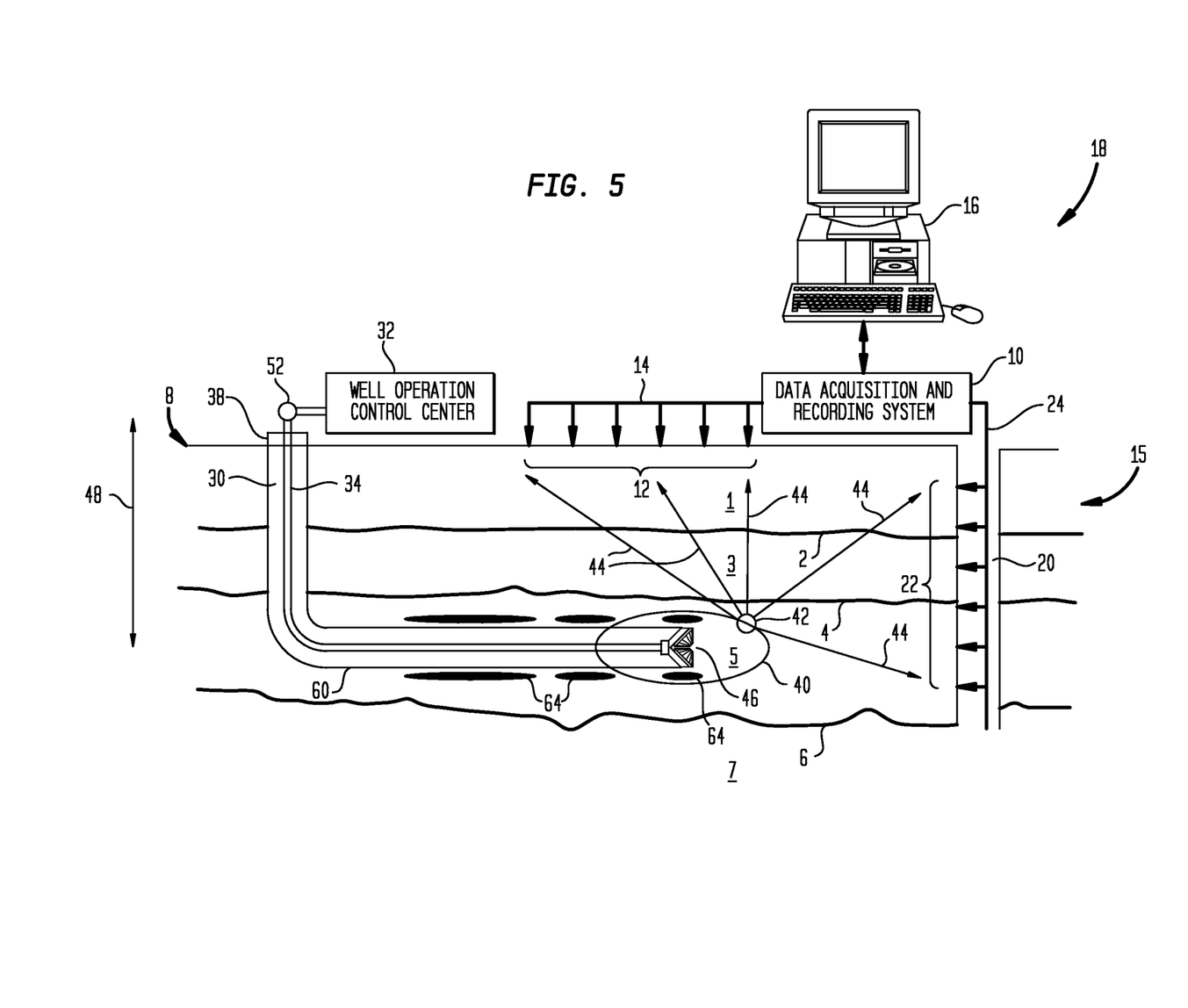
FIG. 5 shows the identification of high and low permeability zones by identifying faults and fractures during horizontal drilling and FIG. 6 shows microseismic energy being recorded during a cementing operation.

In the embodiment shown in FIG. 5, layer 5 is the layer from which the hydrocarbons will be produced after completion of the well. In some embodiments this layer has naturally high porosity and permeability, and no hydraulic fracturing operation is planned. The ability to image the fractures and permeable zones enables the drillers to stay within the most productive zones or "fairways". In other embodiments this layer may be a shale or similar layer with low permeability and a fracturing operation is required to stimulate production of hydrocarbons. In such an embodiment, imaging faults and fractures and other high-permeability zones during the drilling operation enables the engineers to plan the hydraulic fracturing to optimize return on investment. Zones 64 of high permeability and existing natural fracture networks are not good candidates for hydraulic fracturing, as pressurized fracturing fluid may be lost into such zones while not creating any significantly increased flow of hydrocarbons. In some embodiments, the absence of features on the displays of the microseismic data may indicate a zone of low permeability with no natural fracturing. Such a zone is a potential candidate for hydraulic fracturing.

Figure 6:
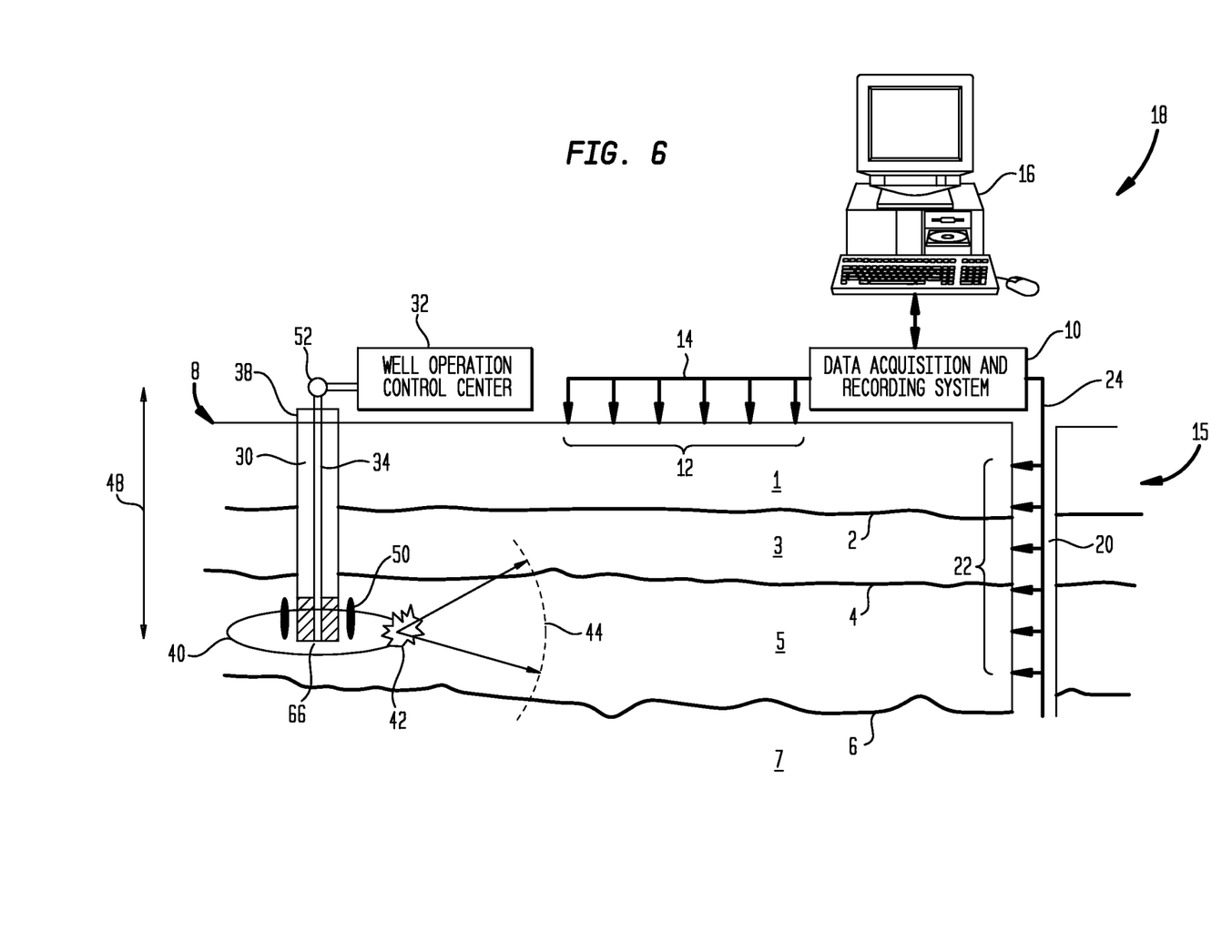

Further embodiments of the current methods may in be applied to the process of cementing a well or a portion thereof. FIG. 6 shows a cementing operation in progress in vertical well bore 30. Cementing involves filling the annular cavity between the metal well casing and the geologic layers with a cement, for all or part of the linear extent of the well. The technique was developed for vertical wells, but cementing may also be performed in deviated and horizontal wells as necessary. The cement prevents the flow of drilling fluids, or fracturing fluids into the surrounding geologic layers. This is of particular importance when the surrounding layers include aquifers, where it is necessary to prevent contamination. Cementing also prevents the loss of oil or gas as the hydrocarbon reserves flow from the producing layers to the surface. In some instances, the cement may prevent the inflow of fluids, typically water, from geologic layers into the well, which could quickly ruin a productive well.

During a cementing operation, the pressure of the cement can cause axial and/or wellbore-perpendicular or other fractures near wellbore 30, just as in the case of hydraulic fracturing or fractures and slip on fractures caused by the weight of the drilling fluid. Cement can sometimes be pumped for vast distances, a mile or more, through existing natural fractures, and may make equally large artificial "cement fractures". According to some embodiments, such faults and fractures may be imaged by recording the seismic energy released during a cementing operation and processing the recorded data. In FIG. 6, a cement "slug" is forced down pipe 34 in well bore 30. Cement 66 then flows back up well bore 30, and sets in place.

Cement 66 is more viscous than drilling fluid or hydraulic fracturing fluid, but may flow into fractures and existing faults, resulting in expansion of the fractures and a release of seismic energy 44. The pressure wave created as cement 66 is pumped into well bore 30 and reaches a layer of high permeability or natural fracturing may also induce fracturing beyond the extent of the subsurface into which cement 66 flows with a corresponding release of seismic energy 44. In some embodiments, processing the microseismic data proximate the time and location of the cementing operation using SET or other techniques to create Tomographic Fracture Images may enable the extent and direction of such fractures to be imaged. In other embodiments, imaging microearthquake hypocenters (with or without focal mechanism solutions) also could provide this information.

The TFI™ or other displays of the microseismic data recorded during the cementing operation can identify problems with the cementing operation. Where no fractures are observed in the microseismic data, and there is no indication that cement 66 is being lost from well bore 30, then the cementing operation may be deemed successful, subject to the normal industry precautions. Where fractures are observed in the microseismic data at times and locations corresponding to the cementing, it is possible that the cementing operation has not been successful because of cement 66 leaking into the surrounding rocks. If the fractures observed on the processed microseismic data images correlate with an apparent loss of cement 66 in well bore 30, then it is even more likely that the cementing operation has encountered problems.

Because of the higher viscosity of cement 66, the loss of cement and accompanying pressure drop will not be as obvious as loss of drilling fluid or hydraulic fracturing fluid. Cement 66 will not propagate as far into the fractures as the less viscous fluids, releasing less seismic energy 44 making the imaging of fractures during cementing harder to achieve. However, any indication that a cementing operation may have problems is valuable information and justifies the drillers running a cement bond log to verify the integrity of the cementing. A cement bond log is an acoustic log or other log that indicates the degree of bonding of cement to the casing and to the geologic layers.

Environmental concerns can be addressed by the current methods, as permeability zones associated with known aquifers may be identified while drilling, and cementing of such zones within the well may be both planned and monitored using TFI™ or other displays of the microseismic data recorded during the drilling and cementing operations. Such displays may be retained and produced at a future time should there be a dispute over possible contamination of an aquifer.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A method of identifying permeable features proximate a well bore during a drilling operation, comprising:

recording, over first periods of time, a microseismic data set during the drilling operation;

recording, over second periods of time, drill bit positions, and times corresponding to the drill bit positions in the well bore during the drilling operation to form a drill bit position and time data set;

correlating times of recording the microseismic data set with the drill bit positions and times corresponding to the drill bit positions recorded in the drill bit position and time data set;

processing the microseismic data set at a plurality of selected times to generate microseismic event images associated with or arising from the drilling operation at drill bit positions in the well bore corresponding to said selected times, and identifying said permeable features proximate the well bore from the microseismic event images.

2. The method of claim 1, wherein drill bit positions and corresponding times are substantially continuously recorded.

3. The method of claim 1, wherein recording microseismic data during a drilling operation further comprises continuing to record microseismic data after cessation of drilling until microseismic activity resulting from the drilling operation has substantially ceased.

4. The method of claim 1, wherein the microseismic data are processed with SET software.

5. The method of claim 1, wherein the microseismic data are processed using an estimated velocity model derived using SET processing of the microseismic data to image a plurality of positions of the drill bit corresponding to known times and positions of the drill bit.

6. The method of claim 1, wherein the microseismic data are processed using an estimated velocity model derived from analysis of conventional surface seismic data.

7. The method of claim 1, wherein the microseismic data are processed using an estimated velocity model derived from analysis of well log data.

8. The method of claim 1 wherein the plurality of selected times is determined by selecting a predetermined time increment during the drilling process.

9. The method of claim 1 wherein the plurality of selected times is determined by selecting times corresponding to a predetermined depth increment during the drilling process.

10. The method of claim 1 wherein the plurality of selected times is determined by selecting times corresponding to a predetermined set of time or depth values during the drilling process.

11. The method of claim 1 wherein the plurality of selected times is determined by selecting times corresponding to events observed during the drilling process.

12. The method of claim 11 wherein the events observed during the drilling process further comprise a drop in the pressure of the drilling fluid.

13. The method of claim 11 wherein the events observed during the drilling process further comprise a loss of drilling fluid.

14. The method of claim 11 wherein the events observed during the drilling process further comprise a change in the rate of drilling corresponding to a change in properties of a geologic layer.

15. The method of claim 1 further comprising determining zones of high permeability by identifying faults and fractures from said microseismic event images.

16. The method of claim 1 further comprising determining zones of low permeability by identifying faults and fractures or the lack thereof from said microseismic event images.

17. The method of claim 1 further comprising determining zones suitable for hydraulic fracturing by identifying faults and fractures or the lack thereof from said microseismic event images.

18. The method of claim 1 further comprising determining zones not suitable for hydraulic fracturing by identifying faults and fractures or the lack thereof from said microseismic event images.

* * * * *